United States Patent
Tzeng et al.

(10) Patent No.: US 7,015,663 B1
(45) Date of Patent: Mar. 21, 2006

(54) BRUSHLESS MOTOR DRIVE DEVICE

(75) Inventors: Guang-Nan Tzeng, Hsinchu (TW); Feng-Rurng Juang, Hsinchu (TW); Chi-Yang Chen, Hsinchu County (TW)

(73) Assignee: Aimtron Technology Corp., Hsinchu (TW)

( * ) Notice: Subject to any disclaimer, the term of this patent is extended or adjusted under 35 U.S.C. 154(b) by 0 days.

(21) Appl. No.: 10/907,240

(22) Filed: Mar. 25, 2005

Related U.S. Application Data

(63) Continuation-in-part of application No. 10/711,235, filed on Sep. 3, 2004, now Pat. No. 6,924,611.

(51) Int. Cl.
*H02P 6/08* (2006.01)

(52) U.S. Cl. .................. 318/254; 318/432; 318/439

(58) Field of Classification Search ................ 318/138, 318/254, 432–434, 439, 720–724
See application file for complete search history.

(56) References Cited

U.S. PATENT DOCUMENTS

| | | | | |
|---|---|---|---|---|
| 3,585,517 A | | 6/1971 | Herbert | |
| 4,295,085 A | * | 10/1981 | Lafuze | 318/721 |
| 4,749,923 A | * | 6/1988 | Chieng | 318/269 |
| 4,814,674 A | * | 3/1989 | Hrassky | 318/254 |
| 5,602,452 A | * | 2/1997 | Underhill | 318/439 |
| 5,811,949 A | | 9/1998 | Garces | |
| 5,859,510 A | * | 1/1999 | Dolan et al. | 318/254 |
| 6,377,008 B1 | * | 4/2002 | Hirata | 318/459 |
| 6,710,568 B1 | | 3/2004 | Fujii | |
| 6,710,572 B1 | | 3/2004 | Okubo | |

* cited by examiner

*Primary Examiner*—Bentsu Ro
(74) *Attorney, Agent, or Firm*—Winston Hsu

(57) ABSTRACT

A Hall sensing circuit generates a positional detection signal representative of a positional relationship between a rotor and a phase coil of a motor. A signal synthesizing circuit transforms the positional detection signal to a driving signal. Based on a comparison of the driving signal and a high-frequency reference signal, a pulse signal is generated for controlling a switching circuit to drive the motor. A current error signal is supplied through feedback to adjust a relative relationship between an amplitude of the drive signal and an amplitude of the high-frequency reference signal, thereby changing a duty ratio of the pulse signal. A duty-ratio limiting circuit is provided to limit the duty ratio of the pulse signal for ensuring a reliable rotation of the motor.

19 Claims, 11 Drawing Sheets

BRUSHLESS MOTOR DRIVE DEVICE

CROSS REFERENCE TO RELATED APPLICATIONS

This application is a continuation-in-part of, and claims benefit of the filing date of, and hereby incorporates fully by reference, a parent application entitled "Brushless Motor Drive Device," Ser. No. 10/711,235, filed Sep. 3, 2004, no U.S. Pat. No. 6,924,611, and assigned to the assignee of the present application.

BACKGROUND OF INVENTION

1. Field of the Invention

The present invention relates to a motor drive device and, more particularly, to a motor drive device for a brushless DC motor.

2. Description of the Prior Art

FIG. 1(a) is a circuit block diagram showing a conventional brushless motor drive device. Referring to FIG. 1(a), a motor M is a three-phase DC brushless motor having three phase coils U, V, and W. A Hall sensing circuit 11 is arranged around the motor M for detecting a position of a rotor of the motor M, thereby generating three positional detection signals HU, HV, and HW. In response to the positional detection signals HU, HV, and HW, a signal synthesizing circuit 12 generates three sinusoidal drive signals SU, SV, and SW. Subsequently, the sinusoidal drive signals SU, SV, and SW are input to a pulse width modulation (PWM) comparing circuit 13 for being individually compared with respect to a high-frequency triangular signal T generated by an oscillating circuit 14. Based on the comparison of the sinusoidal drive signals SU, SV, and SW individually with the high-frequency triangular signal T, the PWM comparing circuit 13 generates three pulse signals PU, PV, and PW to be supplied to three pre-drivers N1, N2, and N3. In response to the pulse signal PU, the pre-driver N1 generates a pair of switching signals UH and UL. In response to the pulse signal PV, the pre-driver N2 generates a pair of switching signals VH and VL. In response to the pulse signal PW, the pre-driver N3 generates a pair of switching signals WH and WL.

A three-phase switching circuit 15 has a pair of switches S1 and S2, a pair of switches S3 and S4, and a pair of switches S5 and S6, each pair being controlled by one corresponding pair of the switching signals UH and UL, VH and VL, and WH and WL. A motor drive current Im is allowed to flow from a drive voltage source Vdd to the coil U when the switch S1 becomes short-circuited and to flow from the coil U to a ground potential when the switch S2 becomes short-circuited. The motor drive current Im is allowed to flow from the drive voltage source Vdd to the coil V when the switch S3 becomes short-circuited and to flow from the coil V to the ground potential when the switch S4 becomes short-circuited. The motor drive current Im is allowed to flow from the drive voltage source Vdd to the coil W when the switch S5 becomes short-circuited and to flow from the coil W to the ground potential when the switch S6 becomes short-circuited.

For detecting the motor drive current Im, a resistor Rs is series-connected between the common connecting point of the switches S2, S4, and S6 and the ground potential. A voltage difference caused by the motor drive current Im flowing through the resistor Rs is supplied as a negative feedback to an inverting input terminal of an error amplifier EA. The error amplifier EA compares the voltage difference representative of the motor drive current Im with a current command signal Icom for generating a current error signal Ierr. Subsequently, the signal synthesizing circuit 12 adjusts the amplitudes of the sinusoidal drive signals SU, SV, and SW in accordance with the current error signal Ierr.

FIG. 1(b) is a waveform timing chart showing operations of the conventional brushless motor drive device. For the sake of simplicity, only is illustrated in FIG. 1(b) the operational waveforms associated with the coil U of the motor M since each of the phase coils U, V, and W of the motor M is operated with similar waveforms. Referring to FIG. 1(b), the pulse signal PU is generated from the comparison of the sinusoidal drive signal SU and the high-frequency triangular signal T through using the PWM comparing circuit 13. More specifically, the HIGH level of the pulse signal PU corresponds to an interval of time when the sinusoidal drive signal SU goes higher than the high-frequency triangular signal T and the LOW level of the pulse signal PU corresponds to an interval of time when the sinusoidal drive signal SU goes lower than the high-frequency triangular signal T. In response to the pulse signal PU, the pre-driver N1 generates the switching signals UH and UL for controlling the switches S1 and S2, respectively.

In order to regulate the motor drive current Im to follow the current command signal Icom, the error amplifier EA supplies the current error signal Ierr to the signal synthesizing circuit 12 for adjusting the amplitude of the sinusoidal drive signal SU. For example, when the motor drive current Im is smaller than the current command signal Icom, the current error signal Ierr controls the signal synthesizing circuit 12 to increase the amplitude of the sinusoidal drive signal SU so as to obtain a sinusoidal drive signal SU'. As clearly seen from FIG. 1(b), the sinusoidal drive signal SU' with a larger amplitude causes the PWM comparing circuit 13 to generate a pulse signal PU' with a larger duty ratio. In response to the pulse signal PU' with the larger duty ratio, the three-phase switching circuit 15 causes an increase of the motor drive current Im and therefore the motor drive current Im approaches to the current command signal Icom.

However, when the difference between the motor drive current Im and the current command signal Icom becomes too large, for example, at the activation of the motor M the motor drive current Im starts from zero, the signal synthesizing circuit 12 may even generate a sinusoidal drive signal SU" with an amplitude larger than that of the high-frequency triangular T in response to an extremely great current error signal Ierr. As a result, the PWM comparing circuit 13 generates a pulse signal PU" with a frequency lower than that of the high-frequency triangular signal T. The low-frequency pulse signal PU" induces a large ripple to the motor torque and deteriorates the smooth rotation of the motor M. Moreover, the low-frequency pulse signal PU" remains at the HIGH/LOW level each cycle for a relatively long time such that the three-phase switching circuit 15 supplies the motor drive current Im in the continuous mode other than the PWM mode. The long-time continuous supply of the motor drive current Im may damage the motor M and the three-phase switching circuit 15. Also, the temperature rising caused by the large heat dissipation may trigger the thermal shutdown mechanism.

SUMMARY OF INVENTION

In view of the above-mentioned problems, an object of the present invention is to provide a brushless motor drive device capable of limiting the duty ratio of the pulse signal.

Another object of the present invention is to provide a brushless motor drive device capable of preventing the frequency of the pulse signal from becoming lower.

Still another object of the present invention is to provide a brushless motor drive device capable of preventing the pulse signal from remaining at the HIGH/LOW level for a relatively long time.

According to one aspect of the present invention, a brushless motor drive device is provided with a comparing circuit and a limiting circuit. The comparing circuit compares a drive signal and a reference signal to generate a pulse signal. The limiting circuit has a first circuit, a second circuit, a first logic circuit, and a second logic circuit. The first circuit generates a first-half duty-ratio limit signal. The second circuit generates a second-half duty-ratio limit signal. The first logic circuit constrains a duty ratio of the pulse signal by using the first-half duty-ratio limit signal and then generating an output signal. The second logic circuit constrains a duty ratio of the output signal of the first logic circuit by using the second-half duty-ratio limit signal.

According to another aspect of the present invention, a brushless motor drive device is provided with a comparing circuit and a limiting circuit. The comparing circuit is implemented by at least one tri-input comparator for comparing a drive signal, a reference signal, and a first-half limit level to generate a pulse signal with limitation on a duty ratio of a first half of the pulse signal. The limiting circuit has a circuit for generating a second-half duty-ratio limit signal, and a logic circuit for constraining a duty ratio of a second half of the pulse signal by using the second-half duty-ratio limit signal.

According to still another aspect of the present invention, a brushless motor drive device is provided with a comparing circuit and a limiting circuit. The comparing circuit is implemented by at least one first tri-input comparator and at least one second tri-input comparator. The first tri-input comparator compares a drive signal, a reference signal, and a first-half limit level to generate a first pulse signal with limitation on a duty ratio of a first half of the first pulse signal. The second tri-input comparator compares a drive signal, a reference signal, and a second-half limit level to generate a second pulse signal with limitation on a duty ratio of a second half of the second pulse signal.

BRIEF DESCRIPTION OF DRAWINGS

The above-mentioned and other objects, features, and advantages of the present invention will become apparent with reference to the following descriptions and accompanying drawings, wherein.

DETAILED DESCRIPTION

The preferred embodiments according to the present invention will be described in detail with reference to the drawings.

Figure 1A:
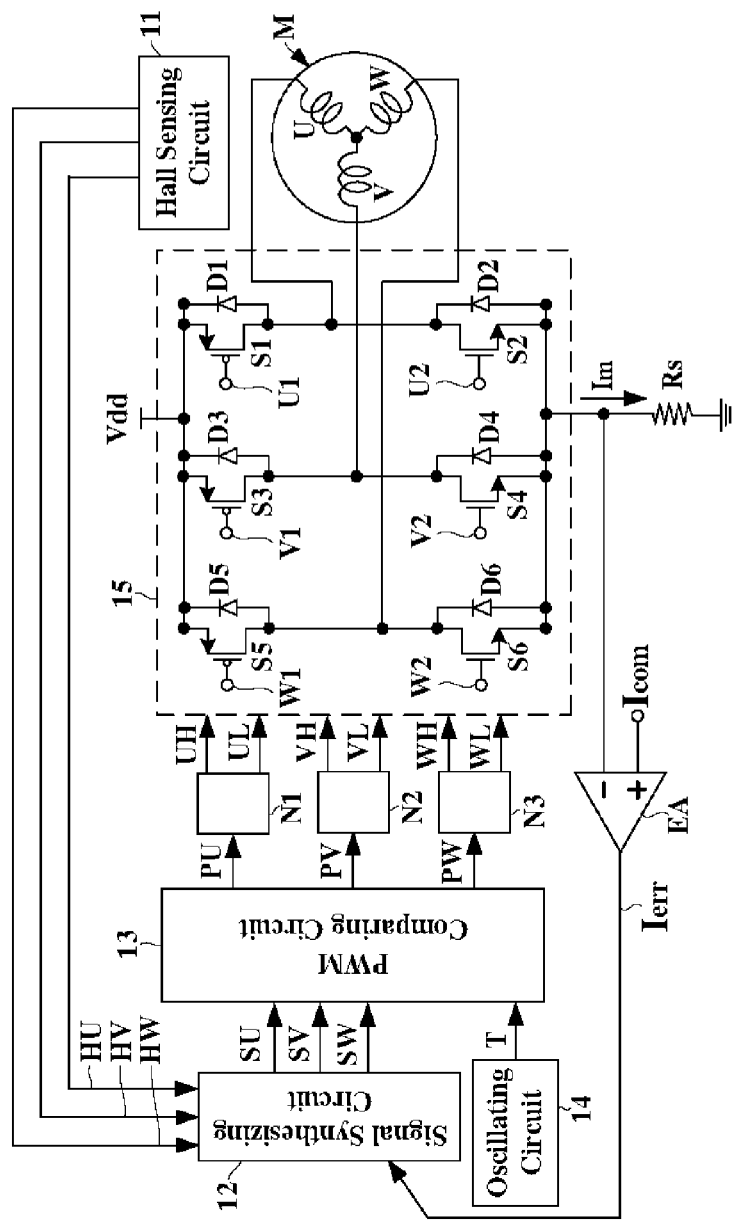
FIG. 1(a) is a circuit block diagram showing a conventional brushless motor drive device.
Figure 1B:
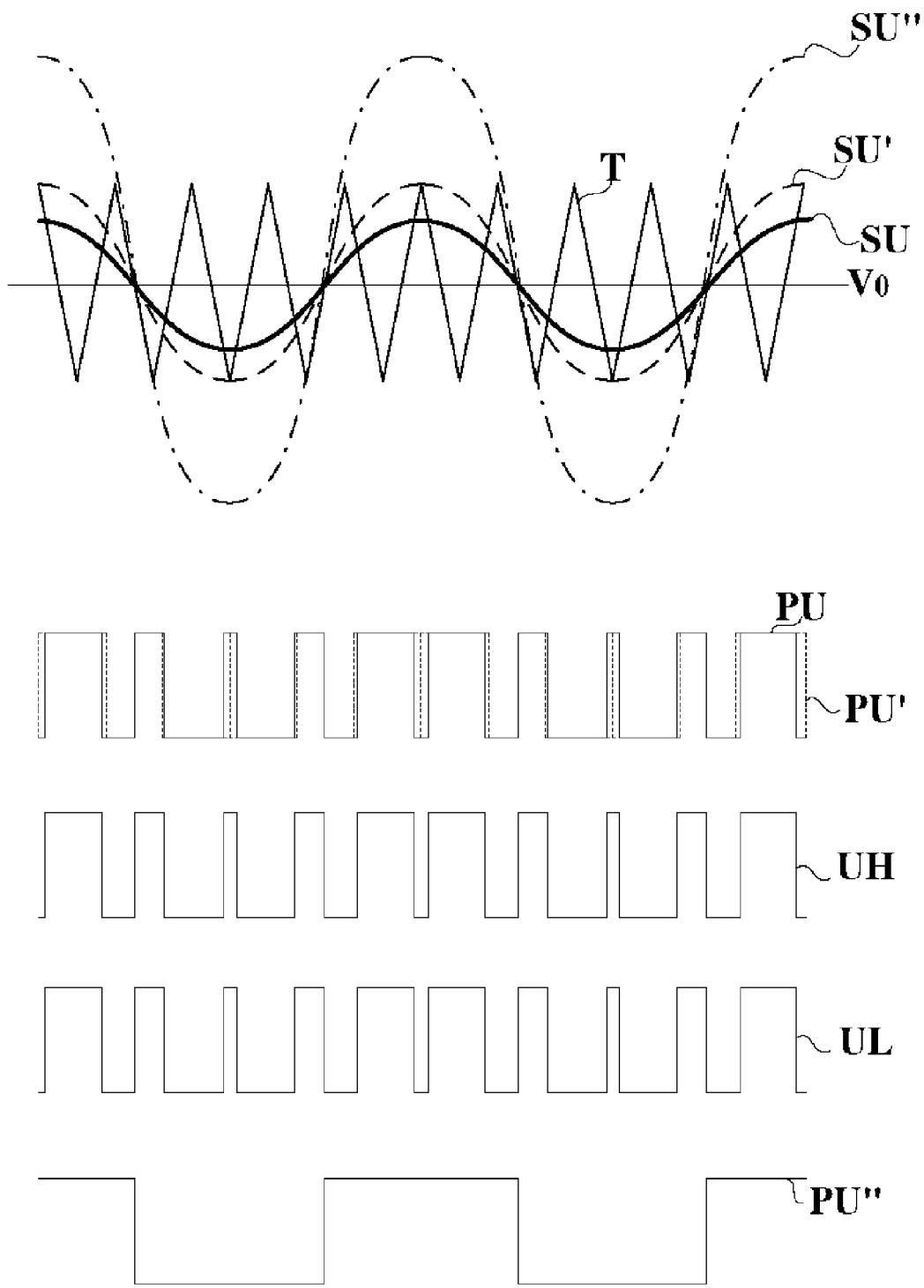
FIG. 1(b) is a waveform timing chart showing operations of a conventional brushless motor drive device.
Figure 2:
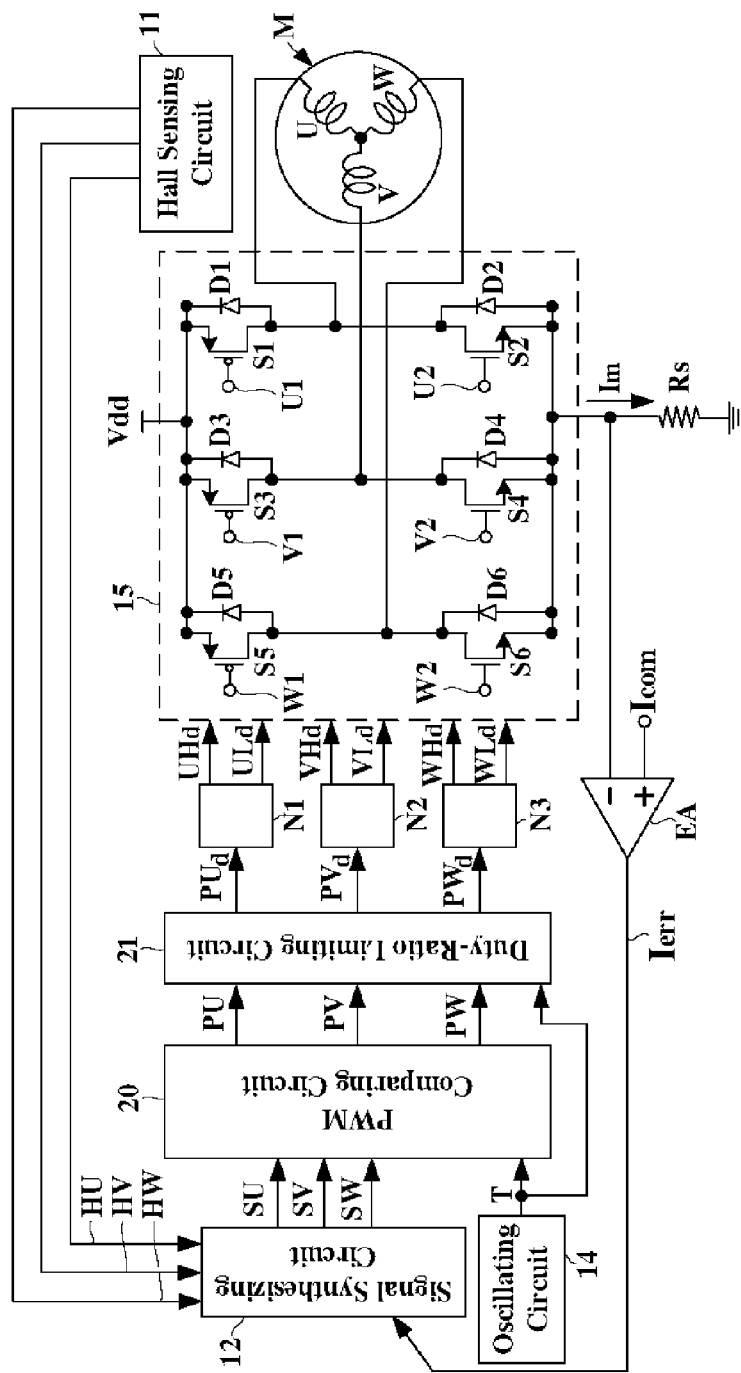
FIG. 2 is a circuit block diagram showing a brushless motor drive device according to the present invention.

FIG. 2 is a circuit block diagram showing a brushless motor drive device according to the present invention. Referring to FIG. 2, a motor M is a three-phase DC brushless motor having three phase coils U, V, and W. A Hall sensing circuit 11 may include three Hall sensors and three Hall amplifiers for the three phase coils U, V, and W, respectively. The Hall sensing circuit 11 is arranged around the motor M for generating three positional detection signals HU, HV, and HW representative of the positional relationships between a rotor of the motor M and the three phase coils U, V, and W, respectively. Each of the positional detection signals HU, HV, and HW is a sinusoidal signal synchronous with the rotation of the motor M and is 120 degrees out of phase with respect to each other. In response to the positional detection signals HU, HV, and HW, a signal synthesizing circuit 12 generates three drive signals SU, SV, and SW.

In one embodiment of the present invention, the drive signals SU, SV, and SW may be implemented by shifting 30 degrees the phases of the corresponding positional detection signals HU, HV, and HW, and therefore the waveforms of the drive signals SU, SV, and SW still remain sinusoidal. In another embodiment of the present invention, the drive signals SU, SV, and SW may be implemented by superposing an appropriate correction signal for compensating the turn-on delay onto the corresponding positional detection signals HU, HV, and HW after the 30-degree phase shifting. Consequently, the waveforms of the drive signals SU, SV, and SW become the superposition of the sinusoidal signal and the correction signal. Many kinds of correction signals have already been disclosed in U.S. Pat. No. 5,811,949, which is incorporated herein by reference.

In one embodiment of the present invention, a high-frequency reference signal T may be implemented by a single triangular signal in which an average value of an amplitude of the triangular signal substantially coincides with an average value of an amplitude of each of the drive signals SU, SV, and SW. In another embodiment of the present invention, the high-frequency reference signal T may be implemented by combining an upper triangular signal and a lower triangular signal, both of which have the same frequency. The valley of the upper triangular signal substantially corresponds in time to the peak of the lower triangular signal. The valley of the upper triangular signal substantially coincides with the average value of the amplitude of each of the drive signals SU, SV, and SW. The peak of the lower triangular signal substantially coincides with the average value of the amplitude of each of the drive signals SU, SV, and SW. Such upper and lower triangular signals have already been disclosed in U.S. Pat. No. 3,585,517, which is incorporated herein by reference.

Based on comparison of the drive signals SU, SV, and SW and the high-frequency reference signal T, a PWM comparing circuit 20 and a duty-ratio limiting circuit 21 are operated in coordination for generating three duty-ratio-limited pulse signals $PU_d$, $PV_d$, and $PW_d$. (A variety of embodiments of the PWM comparing circuit 20 and the duty-ratio limiting circuit 21 will be described in detail later with reference to the drawings.) In response to the pulse signal $PU_d$, a pre-driving circuit N1 generates a pair of switching signals $UH_d$ and $UL_d$. In response to the pulse signal $PV_d$, the pre-driving circuit N2 generates a pair of switching signals $VH_d$ and $VL_d$. In response to the pulse signal $PW_d$, the pre-driving circuit N3 generates a pair of switching signals $WH_d$ and $WL_d$. The pre-driving circuits N1, N2, and N3 not only enhances the driving ability but also creates the non-overlapping characteristic for the waveforms of each pair of the switching signals $UH_d$ and $UL_d$, $VH_d$ and $VL_d$, and $WH_d$ and $WL_d$.

A three-phase switching circuit 15 has a pair of switches S1 and S2, a pair of switches S3 and S4, and a pair of switches S5 and S6, each pair being controlled by the switching signals $UH_d$ and $UL_d$, $VH_d$ and $VL_d$, and $WH_d$ and $WL_d$, respectively. More specifically, the switch S1 is coupled between a drive voltage source Vdd and the coil U while the switch S2 is coupled between the coil U and a ground potential. The switching signal $UH_d$ is supplied to a terminal U1 for controlling the switch S1 while the switching signal $UL_d$ is supplied to a terminal U2 for controlling the switch S2. Therefore, a motor drive current Im is allowed to flow from the drive voltage source Vdd to the coil U when the switch S1 is turned ON and is allowed to flow from the coil U to the ground potential when the switch S2 is turned ON. The switch S3 is coupled between the drive voltage source Vdd and the coil V while the switch S4 is coupled between the coil V and the ground potential. The switching signal $VH_d$ is supplied to a terminal V1 for controlling the switch S3 while the switching signal $VL_d$ is supplied to a terminal V2 for controlling the switch S4. Therefore, the motor drive current Im is allowed to flow from the drive voltage source Vdd to the coil V when the switch S3 is turned ON and is allowed to flow from the coil V to the ground potential when the switch S4 is turned ON. The switch S5 is coupled between the drive voltage source Vdd and the coil W while the switch S6 is coupled between the coil W and the ground potential. The switching signal $WH_d$ is supplied to a terminal W1 for controlling the switch S5 while the switching signal $WL_d$ is supplied to a terminal W2 for controlling the switch S6. Therefore, the motor drive current Im is allowed to flow from the drive voltage source Vdd to the coil W when the switch S5 is turned ON and is allowed to flow from the coil W to the ground potential when the switch S6 is turned ON.

In one embodiment of the present invention, each of the switches S1, S3, and S5 is implemented by a PMOS transistor while each of the switches S2, S4, and S6 is implemented by an NMOS transistor. In another embodiment of the present invention, each of the switches S1 to S6 is implemented by a NMOS transistor.

In one embodiment of the present invention, each pair of the switches S1 and S2, S3 and S4, and S5 and S6 is modulated in a hard chopping manner by the corresponding pair of the switching signals $UH_d$ and $UL_d$, $VH_d$ and $VL_d$, and $WH_d$ and $WL_d$. The hard chopping modulation is referred to as that the upper-side switch S1, S3, or S5 is turned ON/OFF when the lower-side switch S2, S4, or S6 is synchronously, but oppositely, turned OFF/ON. In another embodiment of the present invention, each pair of the switches S1 and S2, S3 and S4, and S5 and S6 is modulated in a soft chopping manner by the corresponding pair of the switching signals $UH_d$ and $UL_d$, $VH_d$ and $VL_d$, and $WH_d$ and $WL_d$. The soft chopping modulation is referred to as that the upper-side switch S1, S3, or S5 is turned ON/OFF and the lower-side switch S2, S4, or S6 keeps OFF during the positive half of the drive signals SU, SV, and SW, and the lower-side switch S2, S4, or S6 is turned ON/OFF and the upper-side switch S1, S3, or S5 keeps OFF during the negative half of the drive signals SU, SV, and SW. The hard and soft chopping modulations have already been disclosed in U.S. Pat. No. 6,710,572, which is incorporated herein by reference.

For detecting the motor drive current Im, a resistor Rs is series-connected between the common node of the lower-side switches S2, S4, and S6 and the ground potential. In another embodiment of the present invention, the resistor Rs may be series-connected between the common node of the upper-side switches S1, S3, and S5 and the drive voltage source Vdd. A voltage difference caused by the motor drive current Im flowing through the resistor Rs is supplied as a negative feedback to an inverting input terminal of an error amplifier EA. The error amplifier EA compares the voltage difference representative of the motor drive current Im with a current command signal Icom for generating a current error signal Ierr. Subsequently, the signal synthesizing circuit 12 adjusts the amplitudes of the drive signals SU, SV, and SW in accordance with the current error signal Ierr.

Although in FIG. 2 the current error signal Ierr is applied to the signal synthesizing circuit 12 for adjusting the amplitudes of the drive signals SU, SV, and SW, the present invention is not limited to this. In another embodiment of the present invention, the current error signal Ierr may be applied to the oscillating circuit 14 for adjusting the amplitude of the high-frequency reference signal T, thereby changing a relative relationship between the amplitudes of the drive signal and the reference signal. In still another embodiment of the present invention, the current error signal Ierr may be applied to the Hall sensing circuit 11 for adjusting the amplitudes of the positional detection signals HU, HV, and HW, indirectly causing the amplitudes of the drive signals SU, SV, and SW to be adjusted. Such techniques regarding the adjustment of the relative relationship between the amplitudes have already been disclosed in U.S. Pat. No. 6,710,568, which is incorporated herein by reference.

Figure 3A:
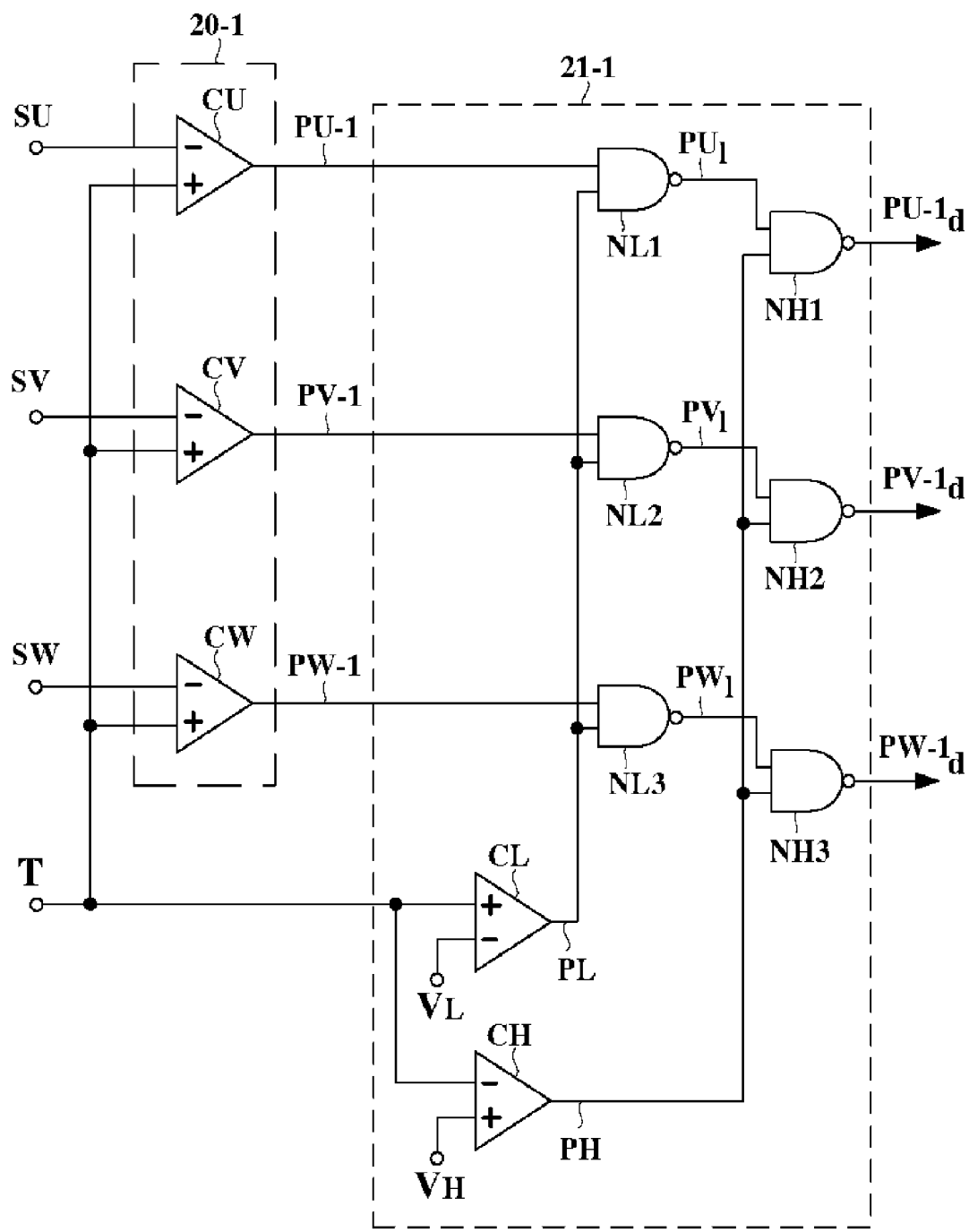
FIG. 3(a) is a detailed circuit diagram showing a first embodiment of a PWM comparing circuit and a duty-ratio limiting circuit according to the present invention.
Figure 3B:
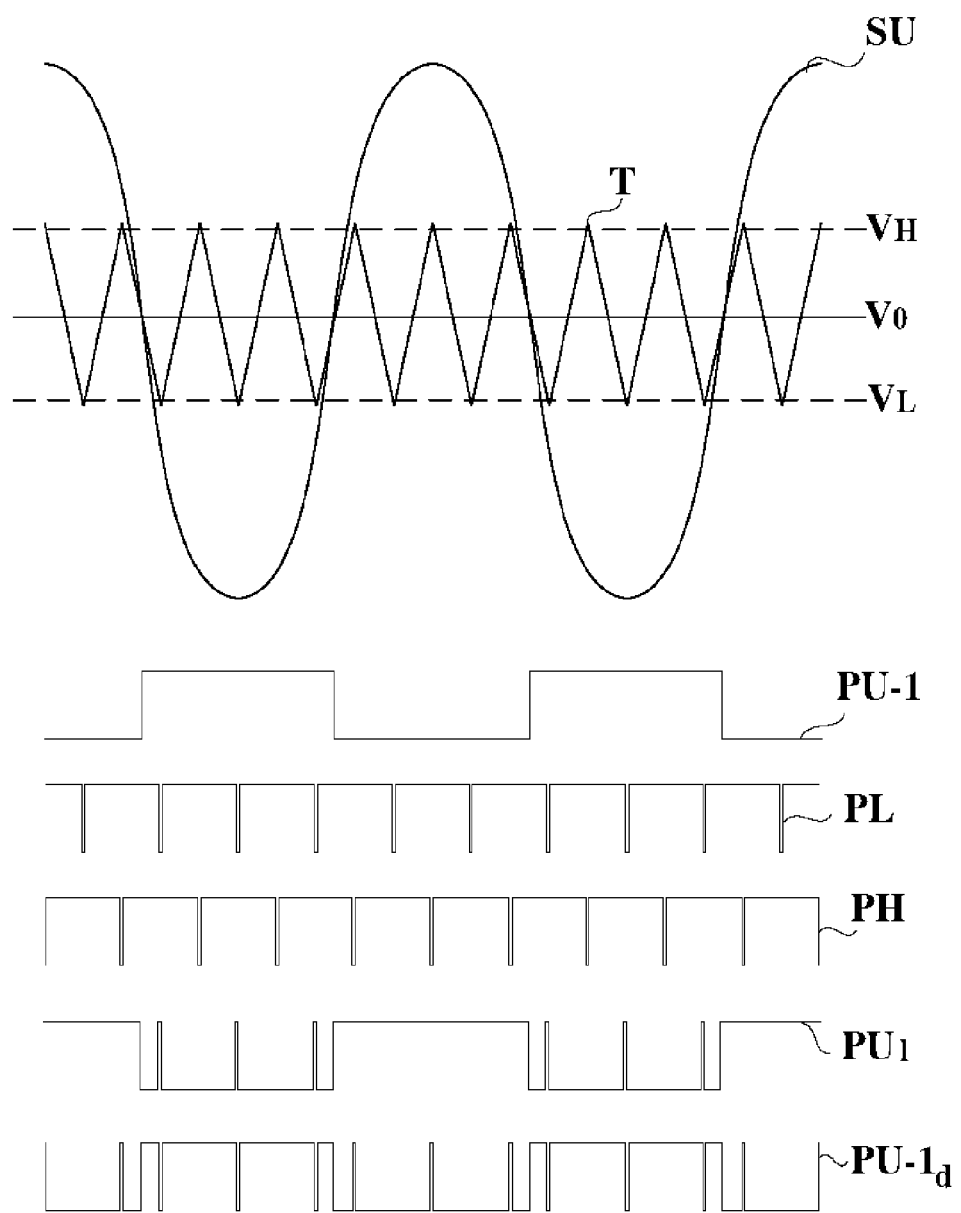
FIG. 3(b) is a waveform timing chart showing an operation of a first embodiment of a PWM comparing circuit and a duty-ratio limiting circuit according to the present invention.

FIG. 3(a) is a detailed circuit diagram showing a first embodiment of a PWM comparing circuit 20-1 and a duty-ratio limiting circuit 21-1 according to the present invention. FIG. 3(b) is a waveform timing chart showing an operation of a first embodiment of a PWM comparing circuit 20-1 and a duty-ratio limiting circuit 21-1 according to the present invention. For the sake of simplicity, only is illustrated in FIG. 3(b) the operational waveforms associated with the coil U of the motor M since each of the phase coils U, V, and W of the motor M is operated with similar waveforms.

The drive signals SU, SV, and SW are supplied to the PWM comparing circuit 20-1 for being individually compared with respect to the high-frequency reference signal T. More specifically, the PWM comparing circuit 20-1 includes three comparators CU, CV, and CW, each having an inverting input terminal for respectively receiving the drive signals SU, SV, and SW and a non-inverting terminal for receiving the high-frequency reference signal T. Based on the comparison of the drive signal SU with the high-frequency reference signal T, the comparator CU generates a pulse signal PU-1. Based on the comparison of the drive signal SV with the high-frequency reference signal T, the comparator CV generates a pulse signal PV-1. Based on the comparison of the drive signal SW with the high-frequency reference signal T, the comparator CW generates a pulse signal PW-1. [Para 41]The duty-ratio limiting circuit 21-1 is used for limiting the duty ratios of the pulse signals PU-1, PV-1, and PW-1. A comparator CL is adopted to compare the high-frequency reference signal T with a predetermined negative-half limit level $V_L$ for generating a negative-half duty-ratio limit signal PL. The negative-half limit level $V_L$ is set substantially equal to the valley of the high-frequency reference signal T and, preferably, slightly larger than the valley. A comparator CH is adopted to compare the high-frequency reference signal T with a predetermined positive-half limit level $V_H$ for generating a positive-half duty-ratio limit signal PH. The positive-half limit level $V_H$ is set substantially equal to the peak of the high-frequency reference signal T and, preferably, slightly smaller than the peak. Subsequently, each of the pulse signals PU-1, PV-1, and PW-1 generated by the PWM comparing circuit 20-1 is constrained by both of the positive-half duty-ratio limit signal PH and the negative-half duty-ratio limit signal PL so as to limit the duty ratio of the complete cycle. For example, the pulse signal PU-1 is constrained at first by the negative-half duty-ratio limit signal PL through a NAND logic gate NL1 to form an output signal $PU_I$. Then, the output signal $PU_I$ is further constrained by the positive-half duty-ratio limit signal PH through a NAND logic gate NH1. As a result, the desirable duty-ratio-limited pulse signal $PU-1_d$ is effectively achieved.

Therefore, the portion of the pulse signal $PU-1_d$ corresponding to the positive half of the drive signal SU has the duty ratio limited by the positive-half duty-ratio limit signal PH while the portion of the pulse signal $PU-1_d$ corresponding to the negative half of the drive signal SU has the duty ratio effectively limited by the negative-half duty-ratio limit signal PL. According to the first embodiment of the present invention, a reliable rotation of the motor M is effectively achieved even when the difference between the motor drive current Im and the current command signal Icom becomes too large.

Figure 4A:
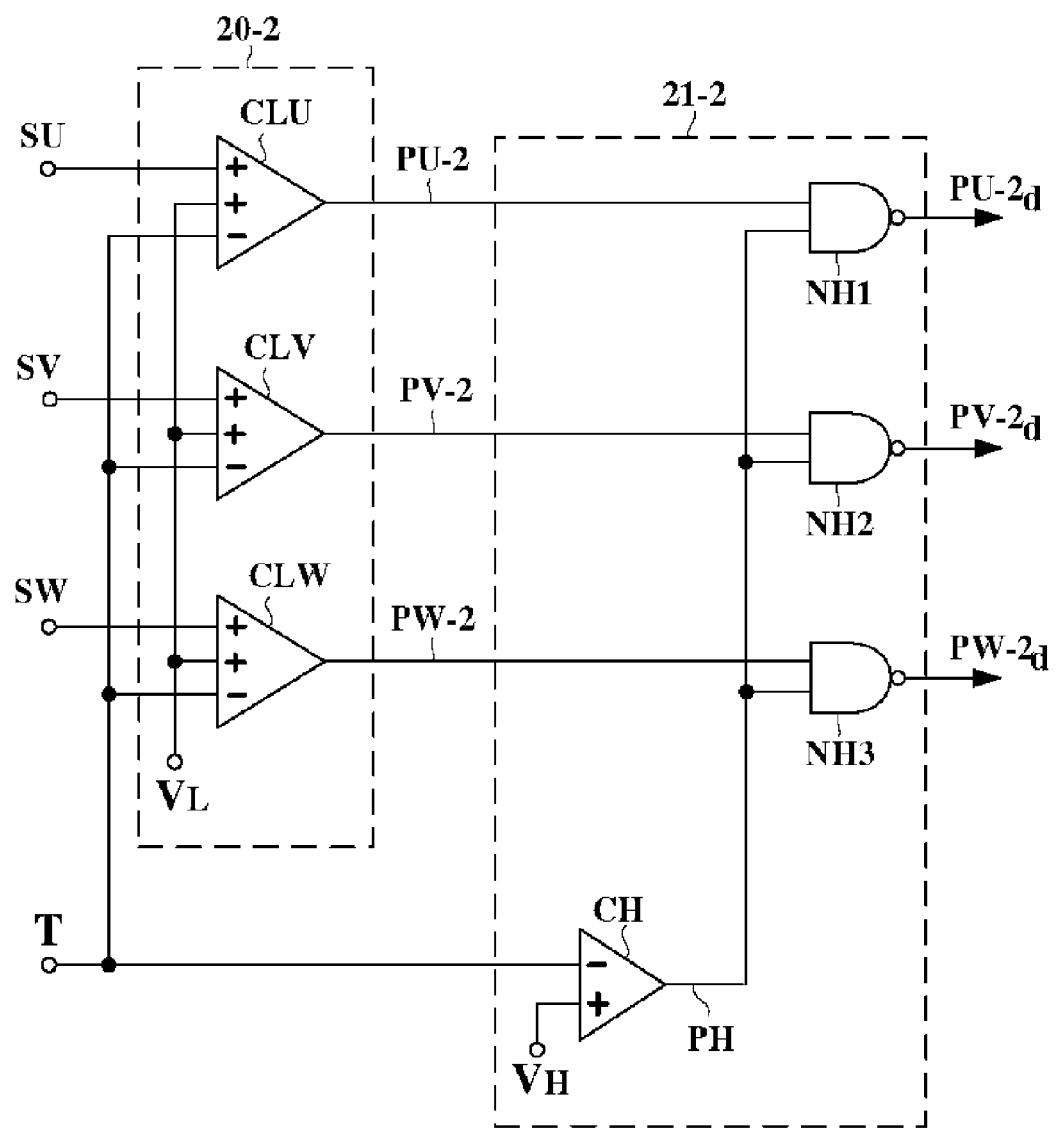
FIG. 4(a) is a detailed circuit diagram showing a second embodiment of a PWM comparing circuit and a duty-ratio limiting circuit according to the present invention.
Figure 4B:
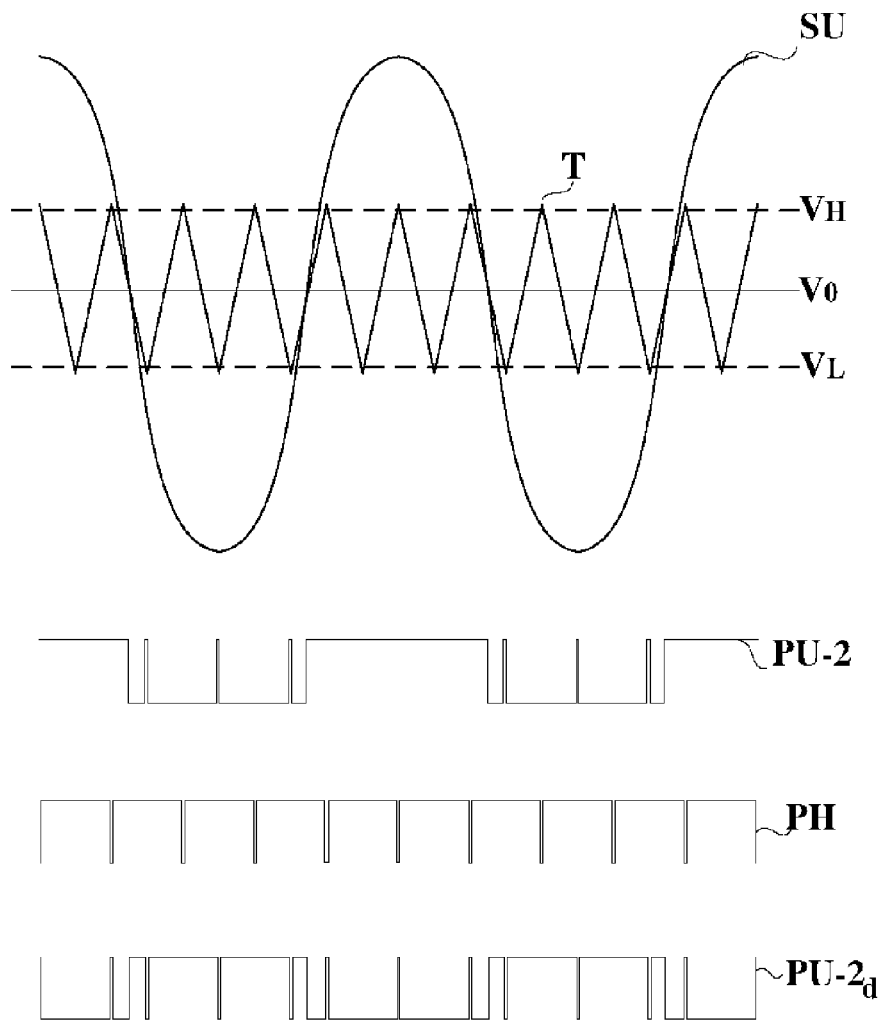
FIG. 4(b) is a waveform timing chart showing an operation of a second embodiment of a PWM comparing circuit and a duty-ratio limiting circuit according to the present invention.

FIG. 4(a) is a detailed circuit diagram showing a second embodiment of a PWM comparing circuit 20-2 and a duty-ratio limiting circuit 21-2 according to the present invention. FIG. 4(b) is a waveform timing chart showing an operation of a second embodiment of a PWM comparing circuit 20-2 and a duty-ratio limiting circuit 21-2 according to the present invention. For the sake of simplicity, only is illustrated in FIG. 4(b) the operational waveforms associated with the coil U of the motor M since each of the phase coils U, V, and W of the motor M is operated with similar waveforms.

The PWM comparing circuit 20-2 is implemented by three tri-input comparators CLU, CLV, and CLW. The tri-input comparator CLU has two non-inverting input terminals for respectively receiving the drive signal SU and a predetermined negative-half limit level $V_L$, and an inverting input terminal for receiving the high-frequency reference signal T. The negative-half limit level $V_L$ is set substantially equal to the valley of the high-frequency reference signal T and, preferably, slightly larger than the valley. Once the high-frequency reference signal T becomes smaller than either of the drive signal SU and the negative-half limit level $V_L$, the tri-input comparator CLU is triggered to output a high level. Therefore, the tri-input comparator CLU effectively generates a pulse signal PU-2 with limitation on the duty ratio during the negative half of the drive signal SU. Likely, the tri-input comparator CLV effectively generates a pulse signal PV-2 with limitation on the duty ratio during the negative half of the drive signal SV. The tri-input comparator CLW effectively generates a pulse signal PW-2 with limitation on the duty ratio during the negative half of the drive signal SW.

The duty-ratio limiting circuit 21-2 is used for limiting the positive-half duty ratios of the pulse signals PU-2, PV-2, and PW-2. A comparator CH is adopted to compare the high-frequency reference signal T with a predetermined positive-half limit level VH for generating a positive-half duty-ratio limit signal PH. The positive-half limit level VH is set substantially equal to the peak of the high-frequency reference signal T and, preferably, slightly smaller than the peak. Subsequently, each of the pulse signals PU-2, PV-2, and PW-2 generated by the PWM comparing circuit 20-2 is constrained by the positive-half duty-ratio limit signal PH so as to limit the duty ratio of the positive half. For example, the pulse signal PU-2 is constrained by the positive-half duty-ratio limit signal PH through a NAND logic gate NH1. As a result, the desirable duty-ratio-limited pulse signal $PU-2_d$ is effectively achieved.

Therefore, the portion of the pulse signal $PU-2_d$ corresponding to the positive half of the drive signal SU has the duty ratio limited by the positive-half duty-ratio limit signal PH while the portion of the pulse signal $PU-2_d$ corresponding to the negative half of the drive signal SU has the duty ratio effectively limited by the negative-half duty-ratio limit signal PL. According to the second embodiment of the present invention, a reliable rotation of the motor M is effectively achieved even when the difference between the motor drive current Im and the current command signal Icom becomes too large.

Figure 5A:
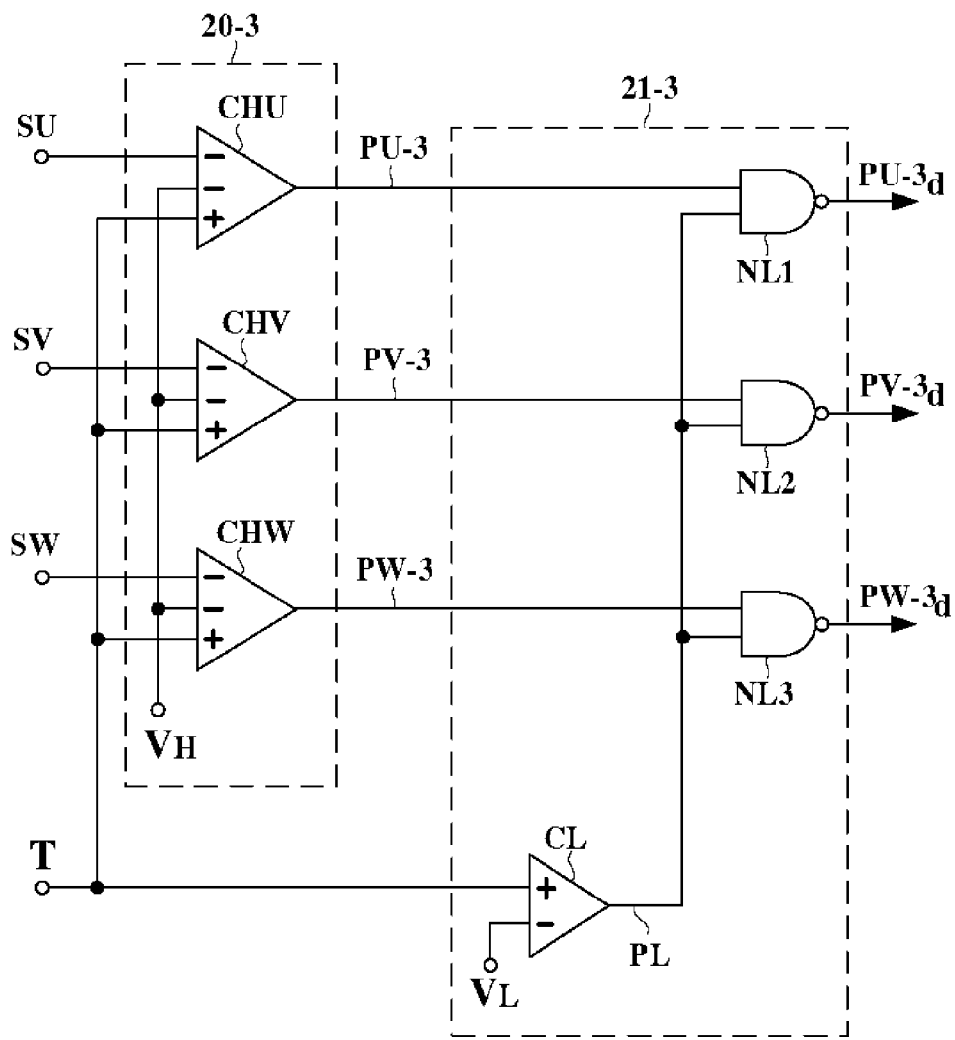
FIG. 5(a) is a detailed circuit diagram showing a third embodiment of a PWM comparing circuit and a duty-ratio limiting circuit according to the present invention.
Figure 5B:
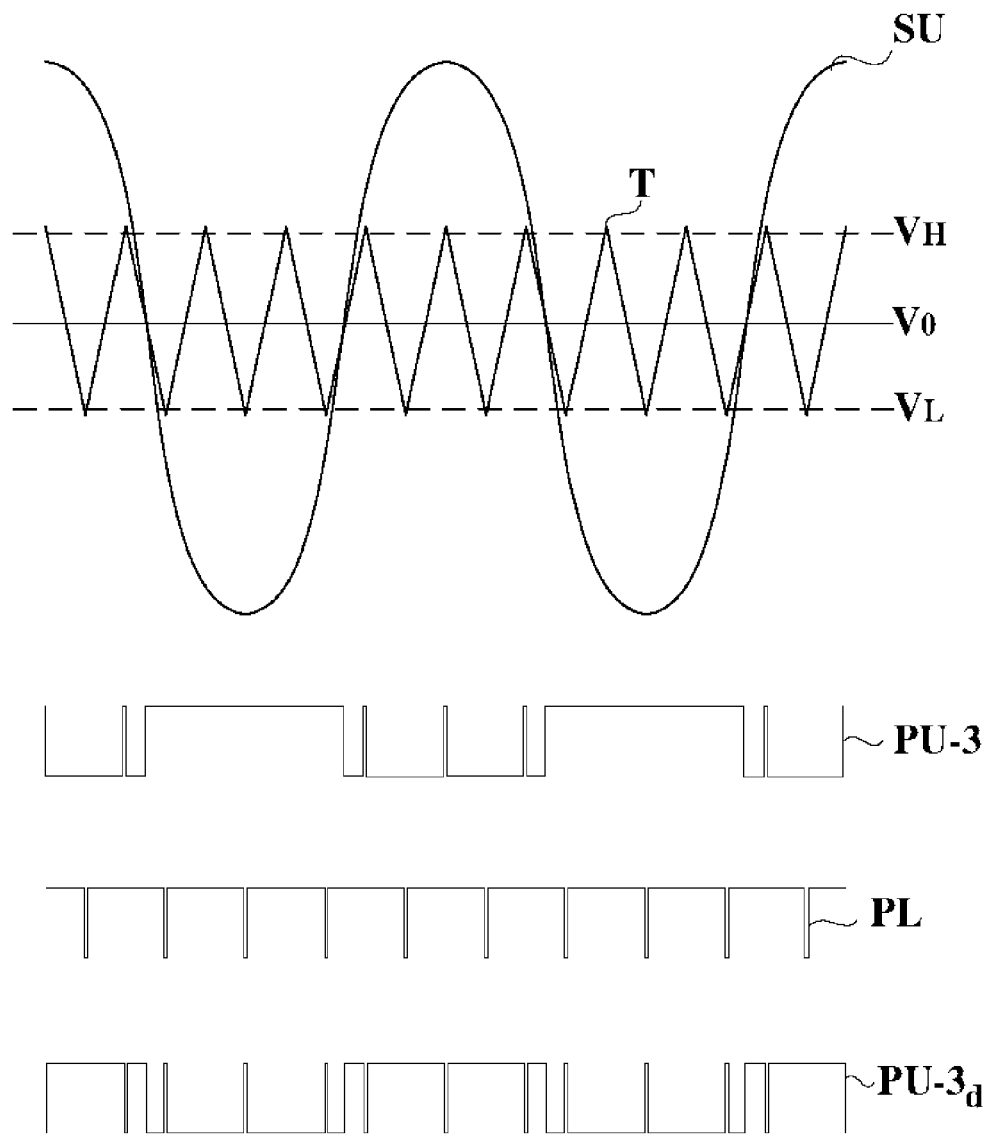
FIG. 5(b) is a waveform timing chart showing an operation of a third embodiment of a PWM comparing circuit and a duty-ratio limiting circuit according to the present invention.

FIG. 5(a) is a detailed circuit diagram showing a third embodiment of a PWM comparing circuit 20-3 and a duty-ratio limiting circuit 21-3 according to the present invention. FIG. 5(b) is a waveform timing chart showing an operation of a third embodiment of a PWM comparing circuit 20-3 and a duty-ratio limiting circuit 21-3 according to the present invention. For the sake of simplicity, only is illustrated in FIG. 5(b) the operational waveforms associated with the coil U of the motor M since each of the phase coils U, V, and W of the motor M is operated with similar waveforms.

The PWM comparing circuit 20-3 is implemented by three tri-input comparators CHU, CHV, and CHW. The tri-input comparator CHU has two inverting input terminals for respectively receiving the drive signal SU and a predetermined positive-half limit level $V_H$, and a non-inverting input terminal for receiving the high-frequency reference signal T. The positive-half limit level $V_H$ is set substantially equal to the peak of the high-frequency reference signal T and, preferably, slightly smaller than the peak. Once the high-frequency reference signal T becomes larger than either of the drive signal SU and the positive-half limit level $V_H$, the tri-input comparator CHU is triggered to output a high level. Therefore, the tri-input comparator CHU effectively generates a pulse signal PU-3 with limitation on the duty ratio during the positive half of the drive signal SU. Likely, the tri-input comparator CHV effectively generates a pulse signal PV-3 with limitation on the duty ratio during the positive half of the drive signal SV. The tri-input comparator CHW effectively generates a pulse signal PW-3 with limitation on the duty ratio during the positive half of the drive signal SW.

The duty-ratio limiting circuit 21-3 is used for limiting the negative-half duty ratios of the pulse signals PU-3, PV-3, and PW-3. A comparator CL is adopted to compare the high-frequency reference signal T with a predetermined negative-half limit level $V_L$ for generating a negative-half duty-ratio limit signal PL. The negative-half limit level $V_L$ is set substantially equal to the valley of the high-frequency reference signal T and, preferably, slightly larger than the valley. Subsequently, each of the pulse signals PU-3, PV-3, and PW-3 generated by the PWM comparing circuit 20-3 is constrained by the negative-half duty-ratio limit signal PL so as to limit the duty ratio of the negative half. For example, the pulse signal PU-3 is constrained by the negative-half duty-ratio limit signal PL through a NAND logic gate NL1. As a result, the desirable duty-ratio-limited pulse signal $PU-3_d$ is effectively achieved.

Therefore, the portion of the pulse signal $PU-3_d$ corresponding to the positive half of the drive signal SU has the duty ratio limited by the positive-half duty-ratio limit signal PH while the portion of the pulse signal $PU-3_d$ corresponding to the negative half of the drive signal SU has the duty ratio effectively limited by the negative-half duty-ratio limit signal PL. According to the third embodiment of the present invention, a reliable rotation of the motor M is effectively achieved even when the difference between the motor drive current Im and the current command signal Icom becomes too large.

Figure 6A:
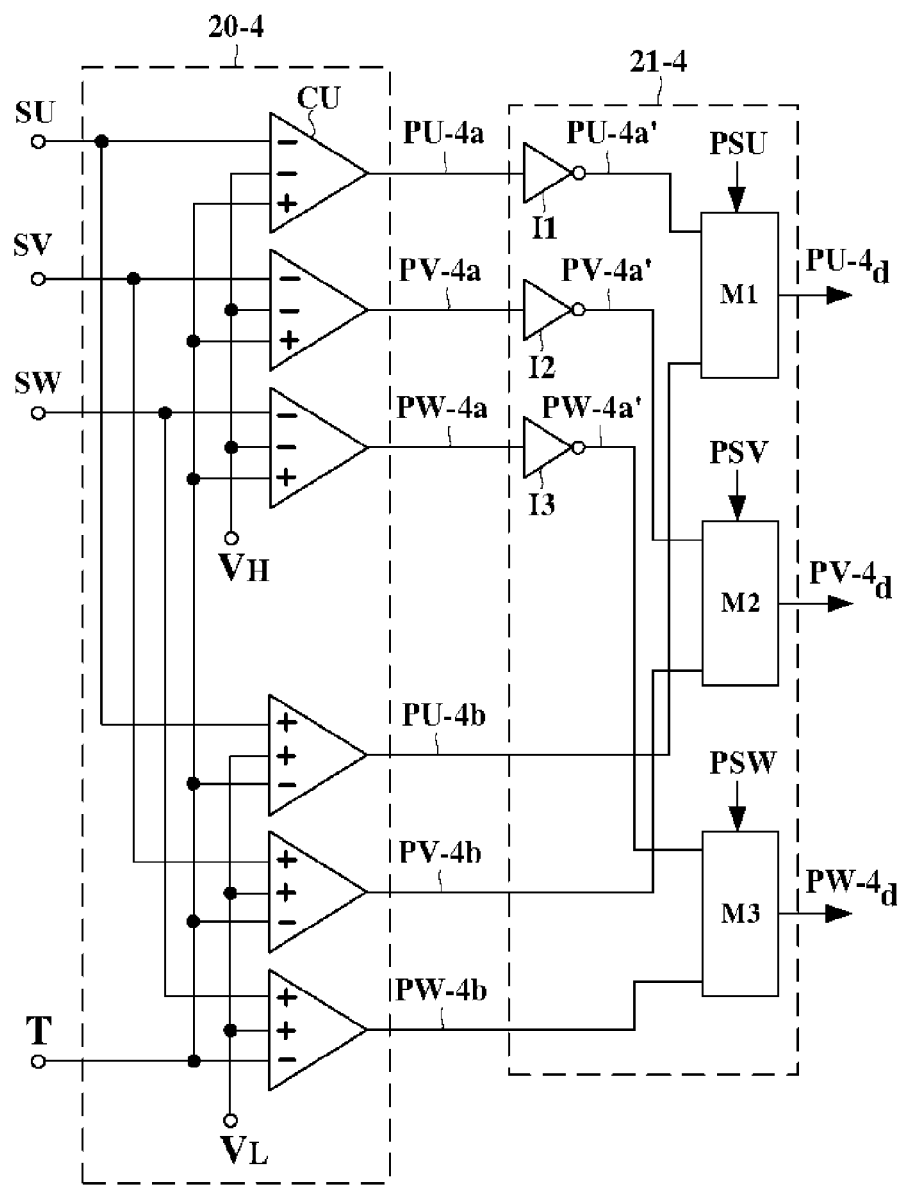
FIG. 6(a) is a detailed circuit diagram showing a fourth embodiment of a PWM comparing circuit and a duty-ratio limiting circuit according to the present invention.
Figure 6B:
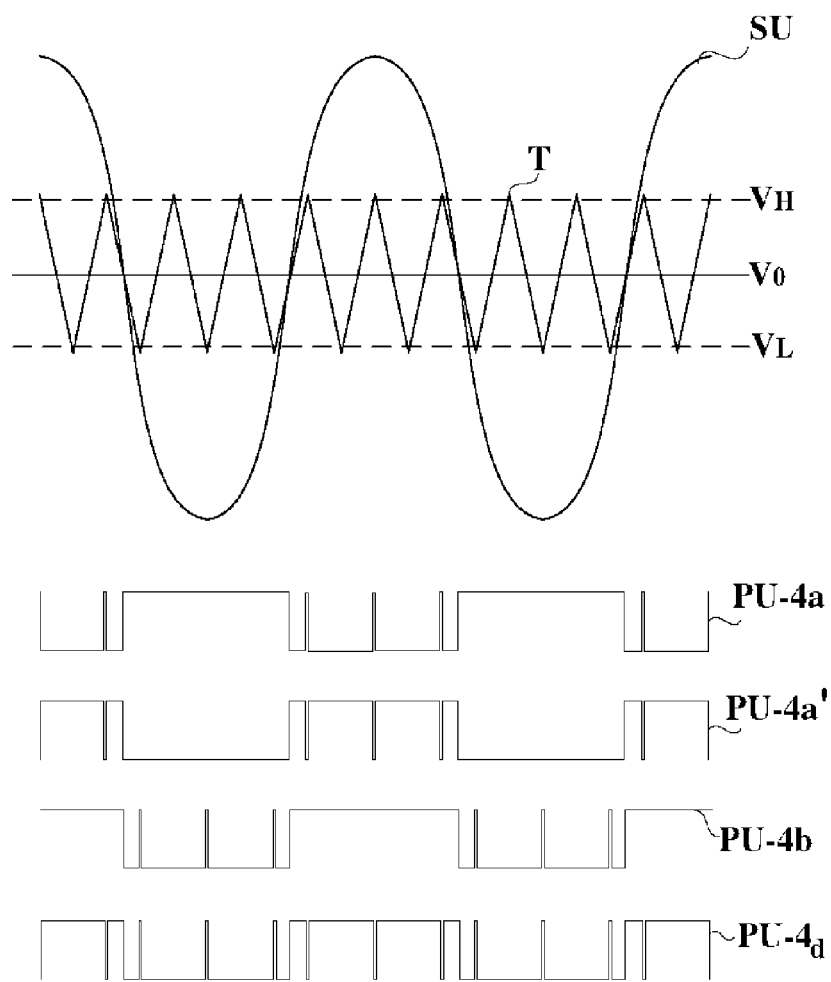
FIG. 6(b) is a waveform timing chart showing an operation of a fourth embodiment of a PWM comparing circuit and a duty-ratio limiting circuit according to the present invention.

FIG. 6(a) is a detailed circuit diagram showing a fourth embodiment of a PWM comparing circuit 20-4 and a duty-ratio limiting circuit 21-4 according to the present invention. FIG. 6(b) is a waveform timing chart showing an operation of a fourth embodiment of a PWM comparing circuit 20-4 and a duty-ratio limiting circuit 21-4 according to the present invention. For the sake of simplicity, only is illustrated in FIG. 6(b) the operational waveforms associated with the coil U of the motor M since each of the phase coils U, V, and W of the motor M is operated with similar waveforms.

The PWM comparing circuit 20-4 is implemented by three tri-input comparators CLU, CLV, and CLW and three tri-input comparators CHU, CHV, and CHW. In other words, the PWM comparing circuit 20-4 is a combination of the PWM comparing circuit 20-2 of FIG. 4(a) and the PWM comparing circuit 20-3 of FIG. 5(a). Consequently, on one hand, the three tri-input comparators CLU, CLV, and CLW effectively generate three pulse signals PU-4a, PV-4a, and PW-4a with limitation on the duty ratio during the negative half of the drive signals SU, SV, and SW. On the other hand, the three tri-input comparators CHU, CHV, and CHW effectively generate three pulse signals PU-4b, PV-4b, and PW-4b with limitation on the duty ratio during the positive half of the drive signals SU, SV, and SW.

The duty-ratio limiting circuit 21-4 is provided with three inverters 11, 12, and 13 for generating three inverted pulse signals PU-4a', PV-4a', and PW-4a'. Additionally, the duty-ratio limiting circuit 21-4 is provided with three multiplexers M1, M2, and M3. The multiplexer M1 has two source inputs for receiving the inverted pulse signal PU-4a' and the pulse signal PU-4b. The multiplexer M1 further has one selection input for receiving a polarity selection signal PSU indicative of the polarity of the drive signal SU, i.e., the positive-half state or the negative-half state. When the drive signal SU is at the positive-half state, the polarity selection signal PSU controls the multiplexer M1 to output the inverted pulse signal PU-4a' as a duty-ratio-limited pulse signal $PU-4_d$, thereby achieving the limitation on the duty ratio. When the drive signal SU is at the negative-half state, the polarity selection signal PSU controls the multiplexer M1 to output the pulse signal PU-4b as a duty-ratio-limited pulse signal $PU-4_d$, thereby achieving the limitation on the duty ratio.

Likely, the multiplexer M2 has two source inputs for receiving the inverted pulse signal PV-4a' and the pulse signal PV-4b. The multiplexer M2 further has one selection input for receiving a polarity selection signal PSV indicative of the polarity of the drive signal SV, i.e., the positive-half state or the negative-half state. When the drive signal SV is at the positive-half state, the polarity selection signal PSV controls the multiplexer M2 to output the inverted pulse signal PV-4a' as a duty-ratio-limited pulse signal $PV-4_d$, thereby achieving the limitation on the duty ratio. When the drive signal SV is at the negative-half state, the polarity selection signal PSV controls the multiplexer M2 to output the pulse signal PV-4b as a duty-ratio-limited pulse signal $PV-4_d$, thereby achieving the limitation on the duty ratio.

Likely, the multiplexer M3 has two source inputs for receiving the inverted pulse signal PW-4a' and the pulse signal PW-4b. The multiplexer M2 further has one selection input for receiving a polarity selection signal PSW indicative of the polarity of the drive signal SW, i.e., the positive-half state or the negative-half state. When the drive signal SW is at the positive-half state, the polarity selection signal PSW controls the multiplexer M3 to output the inverted pulse signal PW-4a' as a duty-ratio-limited pulse signal $PW-4_d$, thereby achieving the limitation on the duty ratio. When the drive signal SW is at the negative-half state, the polarity selection signal PSW controls the multiplexer M3 to output the pulse signal PW-4b as a duty-ratio-limited pulse signal $PW-4_d$, thereby achieving the limitation on the duty ratio.

While the invention has been described by way of examples and in terms of preferred embodiments, it is to be understood that the invention is not limited to the disclosed embodiments. To the contrary, it is intended to cover various modifications. Therefore, the scope of the appended claims should be accorded the broadest interpretation so as to encompass all such modifications.

What is claimed is:

1. A brushless motor drive device comprising:
   a comparing circuit for comparing a drive signal and a reference signal to generate a pulse signal, the drive signal being associated with a rotation of a brushless motor and a frequency of the reference signal being higher than a frequency of the drive signal;
   a switching circuit coupled between a drive voltage source and the brushless motor and controlled by the pulse signal for driving the brushless motor;
   an adjusting circuit for adjusting a relative relationship between an amplitude of the drive signal and an amplitude of the reference signal in accordance with a current error signal representative of a difference between a current command signal and a motor drive current; and
   a limiting circuit having:
   a first circuit for generating a first-half duty-ratio limit signal;

a second circuit for generating a second-half duty-ratio limit signal;
a first logic circuit for constraining a duty ratio of the pulse signal by using the first-half duty-ratio limit signal and then generating an output signal; and
a second logic circuit for constraining a duty ratio of the output signal of the first logic circuit by using the second-half duty-ratio limit signal.

2. The device according to claim 1, wherein:
the first circuit is implemented by a comparator having a first-type input terminal for receiving the reference signal, and a second-type input terminal for receiving a first-half limit level larger than a minimum value of the reference signal.

3. The device according to claim 1, wherein:
the second circuit is implemented by a comparator having a first-type input terminal for receiving a second-half limit level smaller than a maximum value of the reference signal, and a second-type input terminal for receiving the reference signal.

4. The device according to claim 1, wherein:
the first logic circuit is implemented by a NAND logic gate.

5. The device according to claim 1, wherein:
the second logic circuit is implemented by a NAND logic gate.

6. A brushless motor drive device comprising:
a comparing circuit implemented by at least one tri-input comparator for comparing a drive signal, a reference signal, and a first-half limit level to generate a pulse signal with limitation on a duty ratio of a first half of the pulse signal, the drive signal being associated with a rotation of a brushless motor and a frequency of the reference signal being higher than a frequency of the drive signal;
a switching circuit coupled between a drive voltage source and the brushless motor and controlled by the pulse signal for driving the brushless motor;
an adjusting circuit for adjusting a relative relationship between an amplitude of the drive signal and an amplitude of the reference signal in accordance with a current error signal representative of a difference between a current command signal and a motor drive current; and
a limiting circuit having:
a circuit for generating a second-half duty-ratio limit signal, and
a logic circuit for constraining a duty ratio of a second half of the pulse signal by using the second-half duty-ratio limit signal.

7. The device according to claim 6, wherein:
the tri-input comparator has two first-type input terminals for respectively receiving the drive signal and the first-half limit level, and a second-type input terminal for receiving the reference signal.

8. The device according to claim 7, wherein:
the first-type input terminal is implemented by a non-inverting input terminal, and
the second-type input terminal is implemented by an inverting input terminal.

9. The device according to claim 7, wherein:
the first-type input terminal is implemented by an inverting input terminal, and
the second-type input terminal is implemented by a non-inverting input terminal.

10. The device according to claim 6, wherein:
the first-half limit level is larger than a minimum value of the reference signal.

11. The device according to claim 6, wherein:
the first-half limit level is smaller than a maximum value of the reference signal.

12. The device according to claim 6, wherein:
the circuit for generating the second-half duty-ratio limit signal is implemented by a comparator having a first-type input terminal for receiving a second-half limit level smaller than a maximum value of the reference signal, and a second-type input terminal for receiving the reference signal.

13. The device according to claim 6, wherein:
the circuit for generating the second-half duty-ratio limit signal is implemented by a comparator having a first-type input terminal for receiving the reference signal, and a second-type input terminal for receiving a second-half limit level larger than a minimum value of the reference signal.

14. The device according to claim 6, wherein:
the logic circuit is implemented by a NAND logic gate.

15. A brushless motor drive device comprising:
a comparing circuit implemented by at least one first tri-input comparator and at least one second tri-input comparator, the first tri-input comparator for comparing a drive signal, a reference signal, and a first-half limit level to generate a first pulse signal with limitation on a duty ratio of a first half of the first pulse signal, the second tri-input comparator for comparing a drive signal, a reference signal, and a second-half limit level to generate a second pulse signal with limitation on a duty ratio of a second half of the second pulse signal, the drive signal being associated with a rotation of a brushless motor and a frequency of the reference signal being higher than a frequency of the drive signal;
a switching circuit coupled between a drive voltage source and the brushless motor and controlled by the first pulse signal and the second pulse signal for driving the brushless motor;
an adjusting circuit for adjusting a relative relationship between an amplitude of the drive signal and an amplitude of the reference signal in accordance with a current error signal representative of a difference between a current command signal and a motor drive current; and
a limiting circuit for supplying the first pulse signal to the switching circuit when the drive signal is at a first-half state, and supplying the second pulse signal to the switching circuit when the drive signal is at a second-half state.

16. The device according to claim 15, wherein:
the first-half limit level is larger than a minimum value of the reference signal, and
the second-half limit level is smaller than a maximum value of the reference signal.

17. The device according to claim 15, wherein:
the first-half limit level is smaller than a maximum value of the reference signal, and
the second-half limit level is larger than a minimum value of the reference signal.

18. The device according to claim 15, wherein:
the first tri-input comparator has two first-type input terminals for respectively receiving the drive signal and the first-half limit level, and a second-type input terminal for receiving the reference signal.

19. The device according to claim 15, wherein:
the second tri-input comparator has a first-type input terminal for receiving the reference signal, and two second-type input terminals for respectively receiving the drive signal and the second-half limit level.

* * * * *